(12) United States Patent
Neuber

(10) Patent No.: US 8,944,389 B2
(45) Date of Patent: Feb. 3, 2015

(54) FLEXIBLE HOSE TENSIONING DEVICE

(75) Inventor: Wolfgang Neuber, Pressath (DE)

(73) Assignee: Siemens Aktiengesellschaft, Munich (DE)

( * ) Notice: Subject to any disclaimer, the term of this patent is extended or adjusted under 35 U.S.C. 154(b) by 103 days.

(21) Appl. No.: 12/889,204

(22) Filed: Sep. 23, 2010

(65) Prior Publication Data

US 2011/0073702 A1    Mar. 31, 2011

(30) Foreign Application Priority Data

Sep. 29, 2009   (DE) .......................... 10 2009 043 454

(51) Int. Cl.
   *A62C 13/76*     (2006.01)
   *B25J 19/00*     (2006.01)

(52) U.S. Cl.
   CPC ................................. *B25J 19/0025* (2013.01)
   USPC ................... 248/75; 248/79; 248/90; 248/91; 378/194

(58) Field of Classification Search
   CPC ............. F16L 3/01; B02J 19/00; B65H 57/14
   USPC ........... 378/193–198, 101; 248/75, 349.1, 78, 248/79, 89, 90, 91, 346.4, 346.5; 242/615.2
   See application file for complete search history.

(56) References Cited

U.S. PATENT DOCUMENTS

| | | | |
|---|---|---|---|
| 2,201,288 A * | 5/1940 | Ewaldson et al. | 226/194 |
| 2,723,105 A * | 11/1955 | Franklin | 254/416 |
| 2,772,646 A * | 12/1956 | Padgett | 72/50 |
| 2,802,366 A * | 8/1957 | Borner | 474/175 |
| 2,946,559 A * | 7/1960 | Pickett | 254/134.3 PA |
| 3,122,103 A * | 2/1964 | Ormsby | 417/475 |
| 3,209,608 A * | 10/1965 | Saxl | 226/193 |
| 3,329,455 A * | 7/1967 | Becker et al. | 403/76 |
| 3,384,140 A * | 5/1968 | Brothers | 248/89 |
| 3,843,758 A | 10/1974 | Maroschak | |
| 4,251,038 A * | 2/1981 | Gename | 242/397.2 |
| 4,531,688 A * | 7/1985 | Gall | 242/375.1 |

(Continued)

FOREIGN PATENT DOCUMENTS

| | | |
|---|---|---|
| CN | 201342518 Y | 11/2009 |
| DE | 101 41 407 A1 | 10/2002 |

(Continued)

OTHER PUBLICATIONS

German Office Action dated Jun. 12, 2013 for corresponding German Patent Application No. DE 10 2009 043 454.2 with English translation.

(Continued)

*Primary Examiner* — Terrell McKinnon
*Assistant Examiner* — Monica Millner
(74) *Attorney, Agent, or Firm* — Lempia Summerfield Katz LLC

(57) ABSTRACT

A flexible hose tensioning device includes a shaper roller for receiving a flexible hose. The shaper roller includes guide grooves, into which raised sections of the flexible hose engage. The shaper roller and the guide grooves are configured so that there is a form fit between the shaper roller and the flexible hose. An element that holds the flexible hose in the shaper roller and a spring coupled to the shaper roller are also provided. The spring is tensioned when the flexible hose is pulled in a corresponding direction and generates an opposing force to a flexible hose tensile force.

14 Claims, 1 Drawing Sheet

(56) References Cited

U.S. PATENT DOCUMENTS

| | | | | |
|---|---|---|---|---|
| 4,960,266 | A | * | 10/1990 | McDowell et al. .. 254/134.3 PA |
| 5,277,386 | A | * | 1/1994 | Olsen .............................. 248/51 |
| 5,419,362 | A | * | 5/1995 | Blackaby ................. 137/355.16 |
| 5,657,682 | A | * | 8/1997 | Thomas et al. .................... 92/84 |
| 6,065,705 | A | | 5/2000 | Schmitt |
| 6,113,039 | A | * | 9/2000 | Riffle .............................. 248/75 |
| 6,471,189 | B2 | * | 10/2002 | Karlinger ....................... 254/329 |
| 6,595,464 | B2 | * | 7/2003 | Peck ........................... 242/615.2 |
| 6,729,606 | B1 | * | 5/2004 | Durin ............................ 254/395 |
| 7,878,709 | B2 | * | 2/2011 | Herrmann et al. ............. 378/194 |
| 2005/0258302 | A1 | * | 11/2005 | McDaniel et al. ......... 242/615.2 |

FOREIGN PATENT DOCUMENTS

| | | |
|---|---|---|
| DE | 102 11 212 A1 | 9/2003 |
| DE | 102006017843 A1 | 10/2007 |
| DE | 10 2007 058 990 A1 | 6/2009 |
| NO | 894463 A | 5/1991 |

OTHER PUBLICATIONS

Chinese Office Action dated Jan. 22, 2014 for corresponding Chinese Patent Application No. 201010297970.4 with English translation.

* cited by examiner

FIG 1A
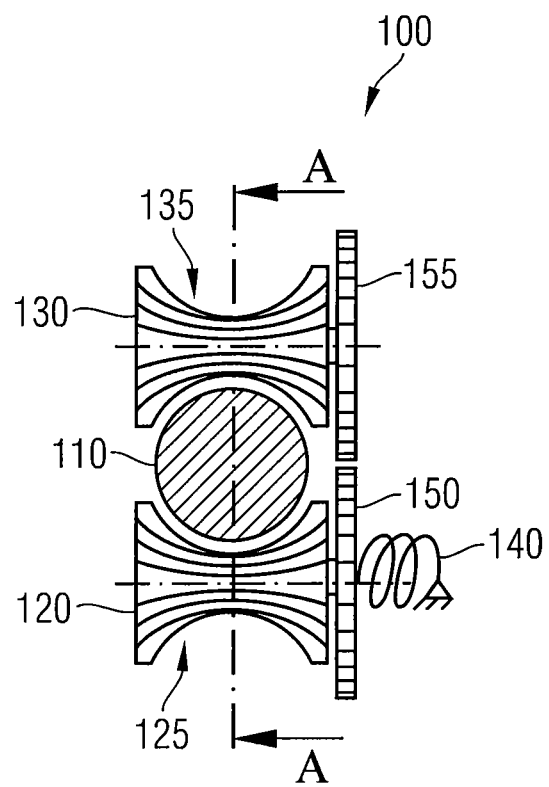
FIG 1B
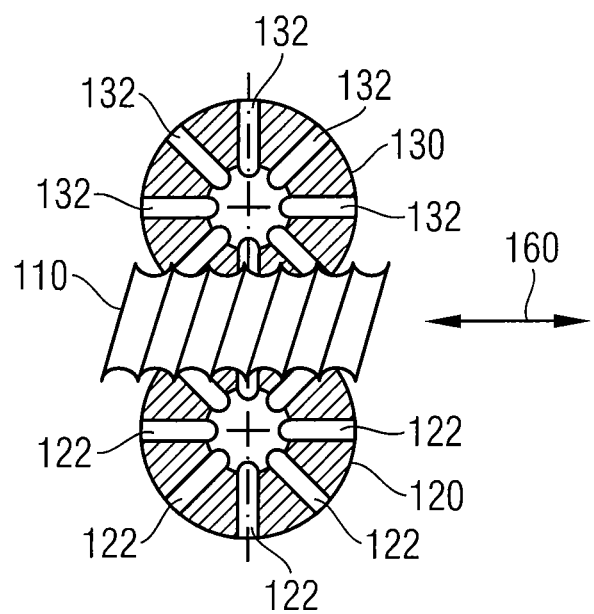
Section A-A
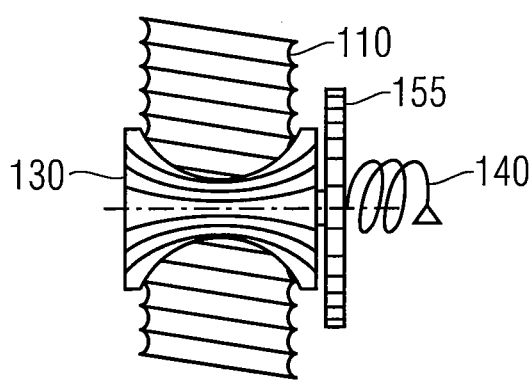
View from above
FIG 1C

FLEXIBLE HOSE TENSIONING DEVICE

This application claims the benefit of DE 10 2009 043 454.2, filed Sep. 29, 2009.

BACKGROUND

The present embodiments relate to a flexible hose tensioning device.

A general problem with robots in industry and medical technology arises when a device carried by a robot arm is supplied with a larger number of electrical, hydraulic, pneumatic and/or other supply lines. The supply lines may not be routed within the robot arm since corresponding movable passages would be provided for each supply line in each joint of the robot arm. Thus, the supply lines may be routed outside the robot arm to the device. To protect the supply lines from damage, the supply lines may be routed in a hose. Flexible hoses may be used for this purpose since flexible hoses have high strength and high flexibility in all directions with a low inherent mass.

A specific set of lines or set of hoses are provided so that the freedom of movement of the arrangement is not restricted. The line or hose is routed so that the hose and the supply lines running in the hose are not damaged during the movement of the robot arm and the device carried by the robot and so that the hose following the movement of the robot arm with inertia-related delays does not cause damage to other components.

It is known from DE 10 2007 058 990 A1 that the hose may be suspended by a wire or a number of wires, where spare hose suspended by one or more wires is available for movements and is released where necessary.

SUMMARY AND DESCRIPTION

The present embodiments may obviate one or more of the drawbacks or limitations in the art. For example, a device that may hold a flexible hose under mechanical tension in the longitudinal direction may be specified.

One embodiment of a flexible hose tensioning device includes a shaper roller that may receive a flexible hose. The shaper roller includes guide grooves, into which the raised sections of the flexible hose engage. The shaper roller and the guide grooves are configured so that a form fit is made between the shaper roller and the flexible hose. A spring is coupled to the shaper roller. The spring is tensioned when the flexible hose is pulled in a corresponding direction and generates an opposing force to a flexible hose tensile force. In this way, the spring holds the flexible hose under mechanical tension in the longitudinal direction. In order to prevent the flexible hose from losing the form fit with the shaper roller, a movable or rigid element that holds the flexible hose pressed into the shaper roller is provided.

In one embodiment, the element that holds the flexible hose in the shaper roller may be a further shaper roller that includes guide grooves in which the raised sections of the flexible hose engage. The further shaper roller and the guide grooves may be configured so that there is a form fit between the further shaper roller and the flexible hose. Shaper rollers of the same shape may be used.

The shaper rollers may be coupled with toothed wheels, the toothed wheels being dimensioned and arranged so that the toothed wheels engage in one another and force a corresponding motion of the shaper rollers.

In one embodiment, shaper rollers that are suitable for tensioning flexible hoses with a circular cross section are used. These shaper rollers may be essentially cylindrical with a fillet running around the shaper rollers.

Essentially round fillets may take the form of circle or parabola segments. In such cases, radius or parabola parameters of the fillet are adapted to the flexible hose diameter. Alternatively, the shape of the shaper rollers may approximately be a single-shell hyperboloid or a rotation body that is produced when a circle segment that is smaller than or equal to a semicircle and arranged in the xz plane above the x axis axis-symmetrically to the z axis rotates around the x-axis, is the rotation body being convex when viewed from the coordinate source. The x-axis simultaneously forms the axis around which the shaper roller rotates in the installed state.

BRIEF DESCRIPTION OF THE DRAWINGS

FIG. 1A is a cross-section view of one embodiment of a flexible hose tensioning device;

FIG. 1B is a sectional view of the flexible hose tensioning device along the line A-A of FIG. 1A; and FIG. 1C is a top view of one embodiment of the flexible hose tensioning device.

DETAILED DESCRIPTION OF THE DRAWINGS

FIG. 1 shows one embodiment of a flexible hose tensioning device 100 in three views. FIG. 1A shows a cross-sectional view along the flexible hose 110. The flexible hose 110 includes a wire formed into a spiral shape that is located in a plastic hose. The wire gives the flexible hose 110 a stable outer form.

The flexible hose 110 shown in FIG. 1 is a round flexible hose 110 (e.g., a flexible hose with a circular cross-section and a tensioning device 100 adapted to this flexible hose shape). However, other flexible hose cross sections and appropriately adapted tensioning devices may be provided.

A characteristic feature of flexible hoses is a groove-shaped outer structure that is produced because the plastic hose surrounding the wire spirals has a slightly smaller diameter than the wire spirals and thus sits tightly on the spirals. In the spaces between two consecutive spiral windings, the diameter of the plastic hose is smaller, so that the surface of the flexible hose when seen along the flexible hose is similar to a toothed rack. The spirals form equidistant raised sections, between which indentations are formed.

This feature is used in the present embodiments in that the flexible hose 100 rests on a shaper roller 120 that is adapted to the outer shape of the flexible hose 100. The shaper roller 120 includes a plurality of guide grooves 122 around the circumference of the shaper roller 120 (FIG. 1B). The plurality of grooves is designed so that consecutive raised sections of the flexible hose 110 engage in consecutive guide grooves 122. In other words, the shaper roller 120 and the guide grooves 122 are configured so that a form fit exists between the shaper roller 120 and the flexible hose 110.

In order to prevent the flexible hose 110 from moving out of the form fit connection with the shaper roller 120, an element that holds the flexible hose 110 in the shaper roller 120 is provided. The element may, for example, be a guide plate that is arranged in relation to the shaper roller 120 so that the flexible hose 110 is tensioned between the guide plate and the shaper roller 120 and remains movable along the longitudinal direction of the flexible hose 110 (e.g., indicated by arrow 160 in FIG. 1B). However, any type of roller or a part of a housing surrounding the tensioning unit 100 (not shown) may be used for the element.

The space between the shaper roller 120 and the element that holds the flexible hose 110 in the shaper roller 120 is selected so that the hose 110 may be well received by the shaper roller 120.

In one embodiment, a further shaper roller 130 is used as the element that holds the flexible hose 110 in the shaper roller 120. The further shaper roller 130 may have the same shape as the shaper roller 120. Further shaper rollers 130 that, for example, have a smaller diameter than the shaper roller 120 or only make a form fit with the flexible hose 110 at some points (e.g., further shaper rollers 130 that are essentially cylindrical and do not have a fillet) may also be used.

In one embodiment, both the shaper roller 120 and the further shaper roller 130 are adapted to the cross section of the flexible hose 110 in order to form fit the shaper rollers 120 and 130 to as large a proportion of the flexible hose circumference as possible.

The shape of the shaper rollers 120, 130 is determined as a function of the cross section of the flexible hose 100. If a flexible hose with an essentially rectangular cross section is used, for example, essentially cylindrical shaper rollers with guide grooves 122, 132 may be used since a form fit is already achieved over the length of the cylindrical shaper rollers. To prevent the flexible hose 110 from shaking out sideways from the flexible hose tensioning device 100, at least one of the shaper rollers 120, 130 may be designed so that the at least one of the shaper rollers 120, 130 encloses the flexible hose 110 from the side as well and provides an additional form fit at the side by continuing the guide grooves.

With a round flexible hose 110, in accordance with one embodiment, shaper rollers 120, 130 are used that are essentially cylindrical with a cutout or fillet 125, 135 running around the shaper rollers 120, 130 adapted to the diameter of the flexible hose. The shaper rollers 120, 130 may have the shape of a double sphere so that the flexible hose 110 makes a secure form fit with each roller at least two points.

In one embodiment, essentially round fillets 125, 135 that, for example, approximately have the shape of the circle or parabola segments are provided. Radius or parabola parameter of the fillets 125, 135 are adapted to the flexible hose diameter. Alternatively, the shapes of the shaper rollers 120, 130 may approximately be a single-shell hyperboloid or the rotation body that is produced when a circle segment smaller than or equal to a semicircle and arranged in the xz plane above the x-axis axis-symmetrically to the z-axis rotates around the x-axis, the rotation body being convex when viewed from the coordinate source. The x-axis simultaneously forms the axis around which the shaper roller 120, 130 rotates in the installed state.

The tensioning effect of the tensioning device 100 is brought about by a spring 140 (shown schematically) coupled to the shaper roller 120. The spring 140 is tensioned if the flexible hose 110 is pulled in a corresponding direction and in this case, generates an opposing force or an opposing moment to a flexible hose tensile force. The tensioning device 100 thus holds the flexible hose 110 in tension and thus prevents unchecked hanging down of the flexible hoses. The tensioning device 100 also pulls the flexible hose 110 back as soon as the flexible hose tensile force falls below the spring force or the spring moment. The spring 114 may be, for example, a torsion spring.

To provide a distribution of force that is as even as possible along the circumference of the flexible hose 110 and to avoid corresponding single-side loading and wear, a coupling between the two shaper rollers 120, 130 may be provided in one embodiment. In the embodiment shown in FIG. 1, this is achieved by two toothed wheels 150, 155. A first toothed wheel 150 is coupled coaxially to the shaper roller 120, and a second toothed wheel 155 is coupled coaxially to the further shaper roller 130. The diameters and the arrangement of the toothed wheels are also selected so that the toothed wheels engage in one another. Since the shaper rollers may be designed the, the toothed wheels 150, 155 may also be designed the same, the result of which is that the shaper rollers 120, 130 execute rotational movements in opposite directions with the same angular speed. If shaper rollers 12, 130 with different diameters are used, different sized toothed wheels are also selected in order to provide a corresponding movement of the shaper rollers 120, 130 (e.g., to provide a uniform linear speed of the flexible hose 110 conveyed or braked by the two shaper rollers 120, 130).

Other drives for coupling the two shaper rollers 120, 130 such as, for example, a (crossed) belt drive with force fit and/or form fit belt-roller coupling may also be used.

One of the two shaper rollers 120, 130 may be supported in the direction of the other shaper roller and through a further spring (not shown), to exert a compression force in the direction of the other shaper roller on the axis of rotation in order to compensate for smaller fluctuations of the flexible hose diameter or deformations occurring during the course of using the flexible hose 110.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A flexible hose tensioning device engageable with a flexible hose, the flexible hose tensioning device comprising:
    a shaper roller comprising a plurality of separate guide grooves, the plurality of separate guide grooves being engageable with raised sections of the flexible hose, each guide groove of the plurality of separate guide grooves extending along a length of the shaper roller and being spaced apart from other guide grooves of the plurality of separate guide grooves around a circumference of the shaper roller;
    a holding element holding the flexible hose in the shaper roller; and
    a spring coupled to the shaper roller, wherein the spring is tensioned if the flexible hose is pulled in a corresponding direction and generates an opposing force to a flexible hose tensile force,
    wherein the shaper roller and the guide grooves are configured such that there is a form fit between the shaper roller and the flexible hose,
    wherein the holding element is a further shaper roller that includes guide grooves that engage in the raised sections of the flexible hose,
    wherein the further shaper roller and the guide grooves of the further shaper roller are configured such that there is a form fit between the further shaper roller and the flexible hose,
    wherein the shaper roller is coaxially coupled to a first toothed wheel and the further shaper roller is coaxially coupled to a second toothed wheel, and
    wherein the first toothed wheel and the second toothed wheel are arranged so that the first toothed wheel and the second toothed wheel engage each other and force a corresponding movement of the shaper roller and the further shaper roller.

2. The flexible hose tensioning device as claimed in claim 1, wherein the shaper roller and the further shaper roller are a same shape.

3. The flexible hose tensioning device as claimed in claim 1, wherein the flexible hose comprises a circular cross section, and wherein the shaper roller is essentially cylindrical with a fillet running around the shaper roller.

4. The flexible hose tensioning device as claimed in claim 3, wherein the fillet is an essentially round fillet.

5. The flexible hose tensioning device as claimed in claim 1, wherein the flexible hose comprises a circular cross section, and wherein the shaper roller and the further shaper roller are each essentially cylindrical with a fillet running around the shaper roller and the further shaper roller, respectively.

6. The flexible hose tensioning device as claimed in claim 2, wherein the flexible hose comprises a circular cross section, and wherein the shaper roller and the further shaper roller are each essentially cylindrical with a fillet running around the shaper roller and the further shaper roller, respectively.

7. The flexible hose tensioning device as claimed in claim 1, wherein each guide groove of the plurality of separate guide grooves extends along the length of the shaper roller but not around the circumference of the shaper roller.

8. The flexible hose tensioning device as claimed in claim 1, wherein a centerline of each guide groove of the plurality of separate guide grooves is coplanar with an axis of rotation of the shaper roller.

9. The flexible hose tensioning device as claimed in claim 1, wherein the shaper roller comprises a first end and a second end, the plurality of separate guide grooves extending along the length of the shaper roller from the first end to the second end.

10. The flexible hose tensioning device as claimed in claim 2, wherein the flexible hose comprises a circular cross section, and wherein the shaper roller is essentially cylindrical with a fillet running around the shaper roller.

11. The flexible hose tensioning device as claimed in claim 10, wherein the fillet is an essentially round fillet.

12. The flexible hose tensioning device as claimed in claim 2, wherein each guide groove of the plurality of separate guide grooves extends along the length of the shaper roller but not around the circumference of the shaper roller.

13. The flexible hose tensioning device as claimed in claim 2, wherein a centerline of each guide groove of the plurality of separate guide grooves is coplanar with an axis of rotation of the shaper roller.

14. The flexible hose tensioning device as claimed in claim 2, wherein the shaper roller comprises a first end and a second end, the plurality of separate guide grooves extending along the length of the shaper roller from the first end to the second end.

* * * * *